US011295731B1

(12) United States Patent
Wong et al.

(10) Patent No.: US 11,295,731 B1
(45) Date of Patent: Apr. 5, 2022

(54) ARTIFICIAL INTELLIGENCE (AI) ENABLED PRESCRIPTIVE PERSUASION PROCESSES BASED ON SPEECH EMOTION RECOGNITION AND SENTIMENT ANALYSIS

(71) Applicant: Lucas GC Limited, Hong Kong (HK)

(72) Inventors: Wang-Chan Wong, Irvine, CA (US); Howard Lee, Porter Ranch, CA (US)

(73) Assignee: Lucas GC Limited, Hong Kong (HK)

( * ) Notice: Subject to any disclaimer, the term of this patent is extended or adjusted under 35 U.S.C. 154(b) by 0 days.

(21) Appl. No.: 17/332,972

(22) Filed: May 27, 2021

Related U.S. Application Data (63) Continuation-in-part of application No. 17/109,283, filed on Dec. 2, 2020, now Pat. No. 11,049,510.

(51) Int. Cl.
  *G10L 15/18* (2013.01)
  *G10L 15/16* (2006.01)
  *H04L 51/02* (2022.01)

(52) U.S. Cl.
  CPC .......... *G10L 15/1815* (2013.01); *G10L 15/16* (2013.01); *H04L 51/02* (2013.01)

(58) Field of Classification Search
  None
  See application file for complete search history.

(56) References Cited

U.S. PATENT DOCUMENTS

| 8,949,263 B1 | 2/2015 | Rosner | 707/758 |
| 2012/0041937 A1 | 2/2012 | Dhillon | 707/708 |
| 2015/0003605 A1* | 1/2015 | Odinak | H04M 3/5175 379/266.07 |
| 2015/0032449 A1 | 1/2015 | Sainath | 704/235 |
| 2017/0308523 A1* | 10/2017 | Wang | G06F 40/242 |
| 2018/0020095 A1* | 1/2018 | Skiba | G06Q 30/016 |
| 2019/0005138 A1* | 1/2019 | Andreica | G06F 16/3329 |
| 2019/0066663 A1* | 2/2019 | Kotri | G06N 3/08 |
| 2020/0134492 A1* | 4/2020 | Copeland | G06Q 30/016 |
| 2020/0202194 A1 | 6/2020 | Wu | |
| 2020/0227026 A1* | 7/2020 | Rajagopal | G10L 15/063 |
| 2020/0279075 A1 | 9/2020 | Avedissian | |
| 2021/0056968 A1* | 2/2021 | Shreeshreemal | G10L 15/063 |

* cited by examiner

*Primary Examiner* — Nafiz E Hoque
(74) *Attorney, Agent, or Firm* — Helen Mao; Imperium Patent Works

(57) ABSTRACT

Methods and systems are provided for the AI-based computer-aided persuasion system (CAPS). The CAPS obtains inputs from both the target and the agent for an object, dynamically generates persuasion references based on analysis of the input. The CAPS obtains content output by analyzing the agent audio stream and the target audio stream using a recurrent network (RNN) model, obtains sentiment classifiers based on a convolutional neural network (CNN LSTM) model, updates a conversation matrix, and generates a persuasion reference based on the updated conversation matrix. The persuasion reference is based on an acceptance likelihood result generated from the conversation matrix using the RNN model. The CAPS further generates a target profile using DNN (deep neural net) with input of target Big Data, wherein the target profile includes one or more objects, and wherein the agent is selected based on the generated profile and one or more selected objects.

20 Claims, 8 Drawing Sheets

FIG. 11

ARTIFICIAL INTELLIGENCE (AI) ENABLED PRESCRIPTIVE PERSUASION PROCESSES BASED ON SPEECH EMOTION RECOGNITION AND SENTIMENT ANALYSIS

CROSS REFERENCE TO RELATED APPLICATIONS

This application is a continuation-in-part and claims priority under 35 U.S.C. § 120 from nonprovisional U.S. patent application Ser. No. 17/109,283, entitled "METHOD AND APPARATUS FOR ARTIFICIAL INTELLIGENCE (AI)-BASED COMPUTER-AIDED PERSUASION SYSTEM (CAPS)," filed on Dec. 2, 2020. The disclosure of each of the foregoing documents is incorporated herein by reference.

TECHNICAL FIELD

The present invention relates generally to a persuasion system and, more particularly, a computer-aided persuasion system.

BACKGROUND

Persuasion as an attempt to change attitudes or behaviors or both, without using coercion or deception. Persuasion has been heavily studied in consumer behavior in designing effective marketing and sales campaigns. With the rapid development of computer technologies, psychological theory of persuasion is adapted into computer technologies. Traditionally, persuasion is classified into three categories, namely, the interpersonal persuasion, the computer-mediated persuasion, and the human-computer persuasion. Interpersonal persuasion occurs when people interact with each other. Interpersonal communication involves verbal and non-verbal forms of behavior, personal feedback, coherence of behavior and an intent to change the attitudes and/or behavior of other (s). The development of computer technology offers other persuasion methods. People may persuade others through e-mails, instant messages, or other computer technologies. This is called computer-mediated persuasion. An example of this would be for someone reading a blog and being persuaded by arguments presented in the blog. With the development of the human-computer interaction technology, persuasion technology is developed. It is defined as the study of how people are persuaded when interacting with computer technology. This is referred to here as human-computer persuasion. To be specific, persuasive technology is defined, as a class of technologies that are intentionally designed to change attitudes or behaviors. It also known as "captology", a term coined by Fogg, a Stanford professor. It focuses on "the design, research and analysis of computing products that are being developed to change people's attitudes or behaviors". Persuasive system, on the other hand, is computerized software that is designed to reinforce, change, or shape attitudes or behavior or both without any forces or deception.

The main differences among these three types of persuasions are the source or origin of the persuader. In both interpersonal persuasion and computer-mediated persuasion, the persuader is a person who initiates a process intending to persuade another person. Human-computer persuasion is different from these two types of persuasion because it is not always possible to know who the actual persuader is. Computer technologies do not have intentions of their own. However, the people who create, distribute, or adopt the technology have the intention and agenda to affect someone's attitudes or behavior. In a sense there is always a "human behind" the computer technologies. Recent development of AI-based social robotics that interacts and communicates with humans highly suggests that interaction similar to social communication are possible in human-computer interaction. For example, semi-humanoid robots can assist customers in a bank. Other social robots are proven to be effective in helping children with autism. Interaction between a personalized Web agent or Chatbot and a user can be considered persuasive communication. From pure interpersonal persuasion to computer-mediated persuasion, to human-computer persuasion, the computer intelligence plays more and more important roles. Social robotics is, however, confined by the physical hardware, i.e., the robot. The current technologies lack the interactive integration among the persuader, the target, i.e., persuadee, the object, i.e., the persuasion topic, and the computer system. The lack of interactive integration in the current computer system greatly reduces the effectiveness in the persuasion technology. New AI-based technology needs to be integrated into the persuasion system to improve the accuracy and efficiency of the system.

Improvements and enhancement are required to enhance the persuasion computer system.

SUMMARY

Methods and systems are provided for the AI-based computer-aided persuasion system (CAPS). The AI-based CAPS obtains and monitors inputs from both the target and the agent for an object during a persuasion session. CAPS dynamically generates persuasion references based on analysis of the input. In one embodiment, the CAPS obtains an agent content output and a target content output by analyzing the agent audio stream and the target audio stream with automatic speech recognition (ASR) that is based on a recurrent network (RNN) deep learning model, obtains an agent sentiment classifier for the agent audio stream and a target sentiment classifier for the target audio stream, wherein each sentiment classifier is derived from an emotion classifier resulting from a convolutional neural network (CNN LSTM) model analysis of a corresponding audio stream, updates a conversation matrix that contains prior and current audio stream analysis based on prior and current content outputs and sentiment classifiers for the agent and the target, and generates a persuasion reference based on the updated conversation matrix. In another embodiment, the persuasion reference is based on an acceptance likelihood result generated from the conversation matrix using the RNN model. In one embodiment, the persuasion reference includes one or more guidance comprising: reference materials of the first object, guidance materials of the first object, suggestion of voice sentiments change for the agent, and one or more suggested new objects. In another embodiment, the one or more guidance in the persuasion reference is ranked. In one embodiment, more suggested new objects are generated using a DNN (deep neural network) with input from subject Big Data that is associated with the first object. In yet another embodiment, the persuasion reference is generated further based on one or more prior persuasion references. In one embodiment, the conversation matrix indicates that a list of guidance on the one or more prior persuasion references is not followed. In another embodiment, the emotion classifier is one selecting from an emotion group comprising angry emotion, excited emotion, frustrated emotion, happy emotion, neutral emotion, sad emotion, and surprised emotion, and the sentiment classifier is one selecting from a sentiment group comprising extremely positive, positive, neutral, negative, extremely negative, and surprised. In yet another embodiment, the CAPS further generates a target profile using DNN with input of target Big Data, wherein the target profile includes one or more objects, and wherein the agent is selected based on the generated profile and one or more selected objects.

In one novel aspect, the prescriptive analytic system is provided to obtain the one or more off-topic items based on the updated conversation matrix. The system obtains a target audio stream from a target when an agent is engaging in a conversation with the target on a target topic and a target content output by analyzing the target audio stream using a recurrent network (RNN) model, detects one or more off-topic items in the target content output with corresponding sentiment classifiers, updates a conversation matrix that contains prior and current target audio stream analysis based on prior and current target content output and sentiment classifiers for the target content output, and generates prescriptive analytics result for the one or more off-topic items based on the updated conversation matrix. In one embodiment, a persuasion reference is generated based on the prescriptive analytics result, which includes the one or more off-topic items with corresponding likelihood of success. Each likelihood of success of corresponding off-topic item generated from the conversation matrix using the RNN model. In another embodiment, the persuasion reference includes an exploitation guidance focused on the target topic and an exploration guidance on the one or more off-topic items.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
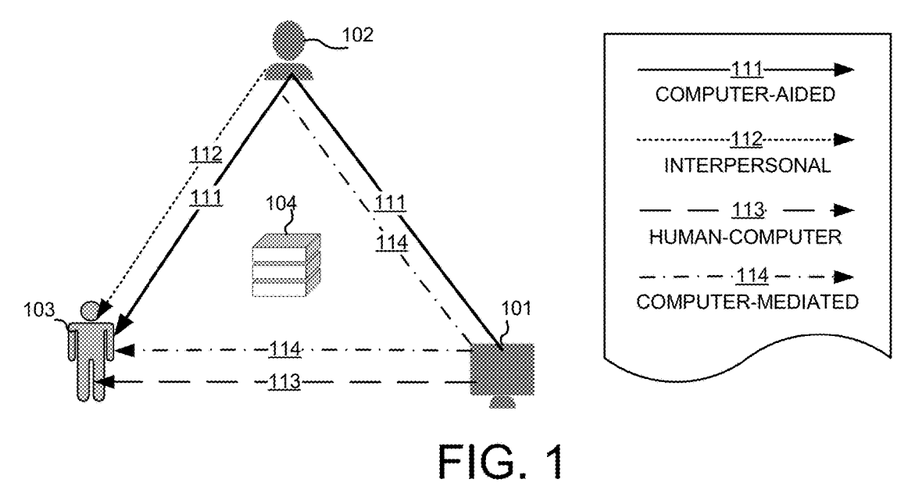
FIG. 1 illustrates exemplary diagrams for different computer persuasion system, including the AI-based computer-aided persuasion system (CAPS) in accordance with embodiments of the current invention.

FIG. 1 illustrates exemplary diagrams for different computer persuasion systems, including the AI-based computer-aided persuasion system (CAPS) in accordance with embodiments of the current invention. In a typical persuasion communication, there are three major components, the persuader, such as an agent 102, a persuadee, such as a target 103, and the persuasion subject matter, such as an object 104. Target 103 refers to an entity or an entity group for whom a persuasion attempt is intended, such as consumers, students, or voters. Agent 102 refers to an entity responsible for designing and constructing a persuasion attempt of an object, such as the company responsible for an advertising campaign, an individual salesperson, or a teacher. Object 104 is the persuasion subject matter such as a product, a service, a vote, a learning concept, or a skill. A persuasion attempt refers to an agent's strategic behavior in presenting information designed to influence the target's believes, attitudes, decisions, or actions. An attempt is the persuasion delivery modality. For example, an attempt can be a one-to-one meeting either in person or over the phone or using virtual meetings. Different persuasion models are developed over the years. The interpersonal persuasion 112 uses direct person-to-person communication between agent 102 and target 103. With the development of technology, computer systems, such as computer system 101, are developed for persuasion communication. A human-computer persuasion 113 uses direct computer-human communication between target 103 and computer system 101. The "human behind" computer system 101 creates algorithms and contents to communicate with target 103. Human-computer persuasion 113 is effective if object 104, such as product and service selections, are simple. For example, an effective chatbot is used to directly communicate with target 103, However, there are products, especially services, that are so complex that it takes a lot of time and effort for a consumer to navigate and sort through the information. For such services and products, conversing with a chatbot online is inefficient and likely adds frustrations to target 103. For example, consider subscribing to a new health plan, buying a new life insurance, deciding on a new financial product, buying a new house, intervening behavior change of a patient, teaching a new subject to a student, and so on. All these situations make a human "intermediary" who is a persuader of a product or service to the consumer necessary. The persuasion then becomes the issue of interpersonal persuasion in the traditional sense. The computer system plays a role in the computer-mediated persuasion 114, which the agent 102 instructs computer system. 101 to communicate with target 103. Computer-mediated persuasion 114 are used for online stores. Target 103, such as online shoppers, directly interact with a computer system while agent 102 updates the contents at the backend. Computer-mediated persuasion 114 lacks human interaction. There are recent movements that consumers are longing for offline services that could only be served with another person. Further, the current persuasion computer system, lacks the latest technologies, such as the AI-based, profile analysis and speech sentiment classification.

In one novel aspect, the computer system 101 is the AI-based computer-aided persuasion system. Computer-aided persuasion 111 has a direct communication path between agent 102 and target 103 with the integrated services provided by computer system 101, which is the computer-aided persuasion system (CAPS). CAPS 101 provides a persuasion reference to agent 102 based on the analysis of the n-ary relationship among the target, the agent, the object, and the one or more attempts. AI technology, such as data mining/deep learning, is implemented for CAPS 101. Target is the focus for the entire process. A domain specific deep learning model is developed based on the target, profile, objects they have acquired or bought in, and the profile of the agents in the attempts of the specific domain. For instance, consider a typical life insurance sales process. The targets are consumers of life insurance products. The objects are the different types of life insurance products. The agents are the life insurance sales agents. The attempts are the 1-to-1 sales meeting between the targets and agents.

Figure 2:
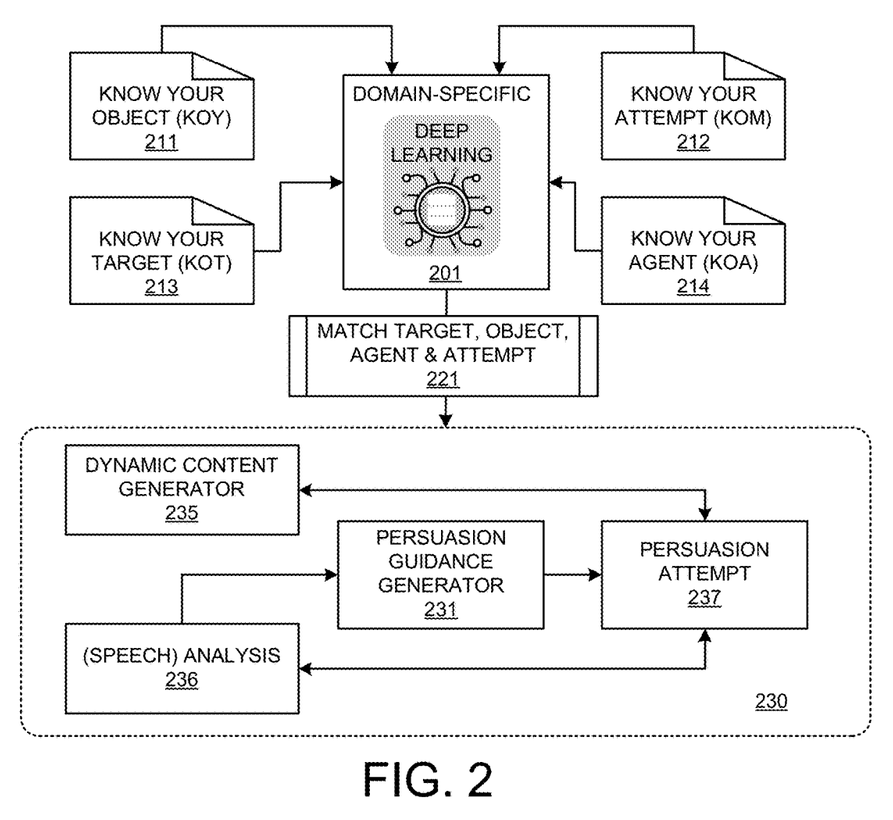
FIG. 2 illustrates exemplary diagrams of an AI-based computer-aided, persuasion system in accordance with embodiments of the current invention.

FIG. 2 illustrates exemplary diagrams of an AI-based computer-aided, persuasion system in accordance with embodiments of the current invention. In one novel aspect, a deep learning model of a specific domain is used in the CAPS. A deep learning module 201 identifies a set of objects for the targets, a set of agents who can best serve a group of targets for the identified objects, and the best attempts/delivery modalities, in which the agents can maximize the success. Domain-specific deep learning module 201 generates a set of domain-specific databases, including a Know Your Object (KOY) 211, a Know Your Attempt (KOM) 212, a Know Your Target (KOT) 213, and a Know Your Agent (KOA) 214. Big Data for each specific domain is obtained to develop and train deep learning model 201 on target, object, agent, and attempt. In one embodiment, at step 221, given a potential target, deep learning module 201 identifies a reference attempt modality, one or more objects, and one or more matching agents to maximize the success of the persuasion. Other types of queries are supported by deep learning module 201. In another embodiment, given one or more objects, deep learning module 201 identifies a group of potential targets, a reference attempt modality, and one or more matching agents to maximize the success of the persuasion. In one embodiment, the identified objects, targets and/or agents are ranked.

The AI-based computer-aided system includes a dynamic persuasion guidance subsystem 230. Dynamic persuasion guidance subsystem 230 includes a persuasion guidance generator 231, a dynamic content generator 235, a speech analysis module 236, and a persuasion attempt module 237. The CAPS generates persuasion contents and guidance and delivers to the agent. In one embodiment, the persuasion contents and guidance are delivered to the agent through content streaming. In another embodiment, the content streaming is delivered to a mobile device of the agent. In another embodiment, the audio content streaming is delivered to a headset of the agent, similar to audio augmented reality (AAR). In one embodiment, persuasion attempt module 237 obtains audio streams of the agent and the target for the persuasion conversation. In other embodiment, a record of one or more persuasion attempts is obtained by persuasion attempt module 237, such as a video stream or other means of persuasion exchanges. The speech analysis module 236 analyzes the audio stream or other forms of exchanges between the target and the agent from persuasion attempt module 237. The result of the analysis from analysis module 236 is sent to persuasion generator 231. Persuasion generator 237 dynamically updates the persuasion reference and/or persuasion guidance based on the input of the analysis.

In one embodiment, the persuasion exchanges are audio streams. The audio streams from the target and the agent are analyzed for content exchange and accompanying sentiment classifiers. Each audio stream is analyzed for content as well as for concurrent emotion and/or sentiment. The enhanced speech analysis enables the CAPS to better simulates a human interaction scenario to improve the accuracy of the contents of the conversation.

Figure 3:
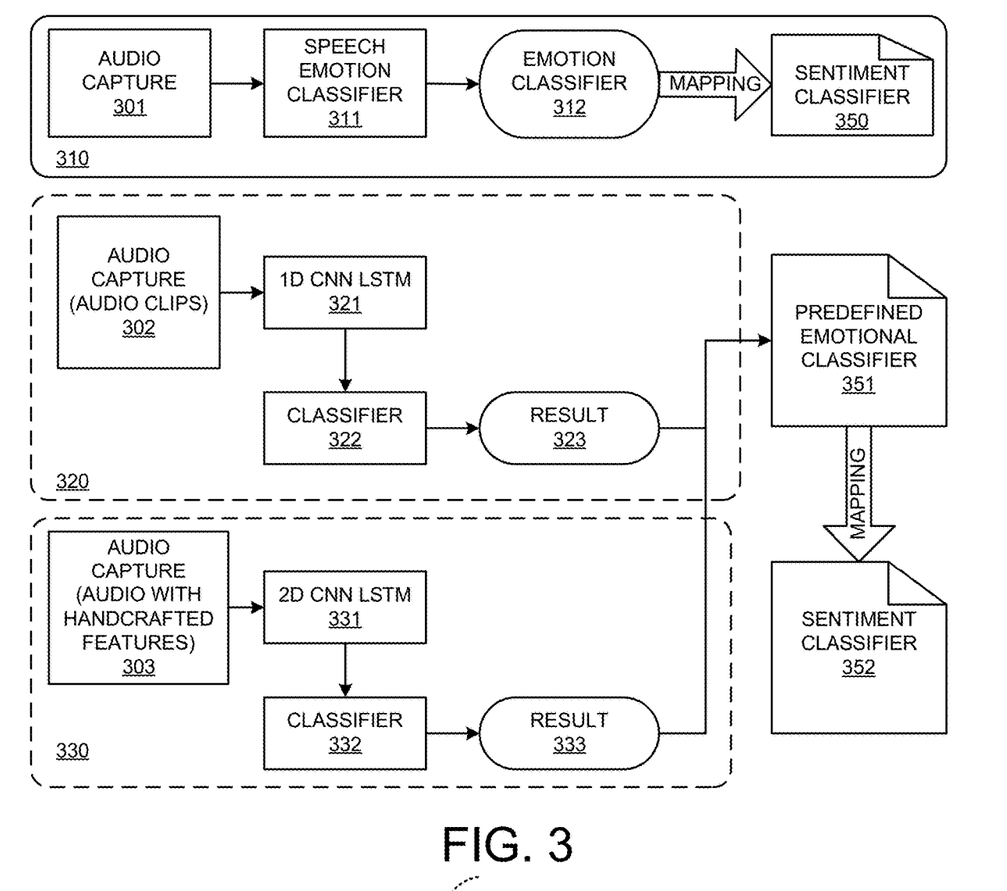
FIG. 3 illustrates exemplary diagrams for speech sentiment classifier generation based on input audio stream in accordance with embodiments of the current invention.

FIG. 3 illustrates exemplary diagrams for speech sentiment classifier generation based on input audio stream in accordance with embodiments of the current invention. In one novel aspect, in addition to contents assessment to an audio stream or an audio clip, which is a part of the audio stream, the concurrent sentiment classifier is generated based on emotion classifier of the audio stream/audio clip. In general, a sentiment classifier generation 300 includes the audio capturing system 301, speech emotion classifier processing 311, resulting emotion classifier 312, and the resulting sentiment classifier 350.

Audio capturing system 301 receives an input audio stream, such as a target audio stream or an agent audio stream corresponding to a part of the persuasion conversation. The audio capturing system 301 sends the identified audio stream to speech emotion classifier processing 311. Speech emotion classifier processing 311 uses a speech emotion recognition procedure to identify an emotion classifier for the audio stream/clip. The speech emotion recognition is based on a machine learning model that takes two steps. The first step is feature extraction. The second step is model building. Feature extraction has different approaches. One approach is to detect significant features directly from raw sound samples. The other approach uses only one specific feature of a sound file as input to the learning model. The latter approach is essentially a supervised machine learning model that uses a handcrafted feature sound file. The supervised learning model yields better accuracy. However, it is more expensive, and it requires expert or professional knowledge. Once features are extracted, a classifier model can be developed, trained, assessed, and fine-tuned. Many data mining models have been proposed, including the Support Vector Machine (SVM), Logistic Regressions, Hidden Markovian Model, and Neural Networks, such as a convolutional neural network (CNN) and a deep neural network (DNN). There are different emotion classifiers based on different models used. Once emotion classifier 312 is generated for the corresponding audio stream/clip, the sentiment classifier 350 is generated. In one embodiment, a direct mapping is used to map each to a set of predefined sentiment classifiers based on predefined rules.

In one embodiment, a 1-dimensional (1D) CNN LSTM 320 is used to generate the speech emotion classifier. Audio clip file 302 is captured for the corresponding dialog. ID CNN LSTM 321 processes the audio clip. ID CNN LSTM recognizes speech emotion from raw data of audio clips. The processed data is sent to classifier 322 to generate emotion classifier result processor 323. Result processing 323 generates predefined emotion classifier for the audio stream/clip. The generated speech emotion classifier 351 is mapped to sentiment classifier 352.

In another embodiment, a 2-dimensional (2D) CNN LSTM 330 is used to generate the emotion classifier. Audio stream/clip 303 is produced for the corresponding identified part of the persuasion conversation. 2D CNN LSTM 331 processes the audio stream. 2D CNN LSTM works on learning global contextual information from the handcrafted features. The processed data is sent to classifier 332 to generate emotion classifier result processor 333. Result processing 333 generates a predefined emotion classifier for the audio clip. The generated emotion classifier 351 is mapped to sentiment classifier 352.

Different speech emotion recognition methods may be used to obtain the speech emotion classifier from the audio stream. In one embodiment, the speech emotion classifiers are used to generate the sentiment classifier, which correlates with the content output of the audio stream.

Figure 4:
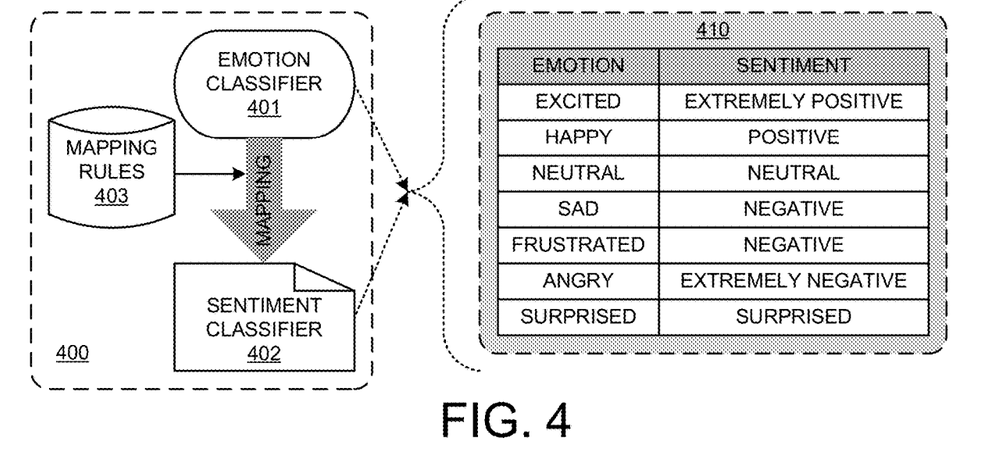
FIG. 4 illustrates exemplary diagrams for obtaining the sentiment classifier for an audio stream based on the speech emotion classifier of the audio stream using direct mapping in accordance with embodiments of the current invention.

FIG. 4 illustrates exemplary diagrams for obtaining the sentiment classifier for an audio stream based on the emotion classifier of the audio stream using direct mapping in accordance with embodiments of the current invention. A sentiment classifier generator 400 includes a mapping rule 403, an emotion classifier 401, and a sentiment classifier 402. Emotion classifier 401 is obtained for an audio clip using a speech emotion recognition method, such as the ID CNN LSTM and the 2D CNN LSTM. In one embodiment, seven different emotion classifiers are defined to identify the emotion result of the audio clip. Column-1 of table 410 shows an example of seven emotion classifiers, including excited, happy, neutral, sad, frustrated, angry, and surprised. In one embodiment, a mapping of each emotion classifier to a sentiment classifier is used. The mapping rule 403 is used for the mapping procedure. Table 410 illustrates an exemplary mapping of the seven emotion classifiers to corresponding sentiment classifiers. The sentiment classifier is used together with its corresponding assessment result of the same audio clip. Mapping rule 403 is predefined or preconfigured. Mapping rule 403 can be dynamically changed as well. An example of the mapping is shown in Table 410. For instance, emotion classifier "excited" is mapped to sentiment classifier "extremely positive." Similarly, "happy" is mapped to "positive," "neutral" is mapped to "neutral," "sad" is mapped to "negative," "frustrated" is mapped to "negative," "angry" is mapped to "extremely negative," and "surprised" is mapped to "surprised."

Figure 5:
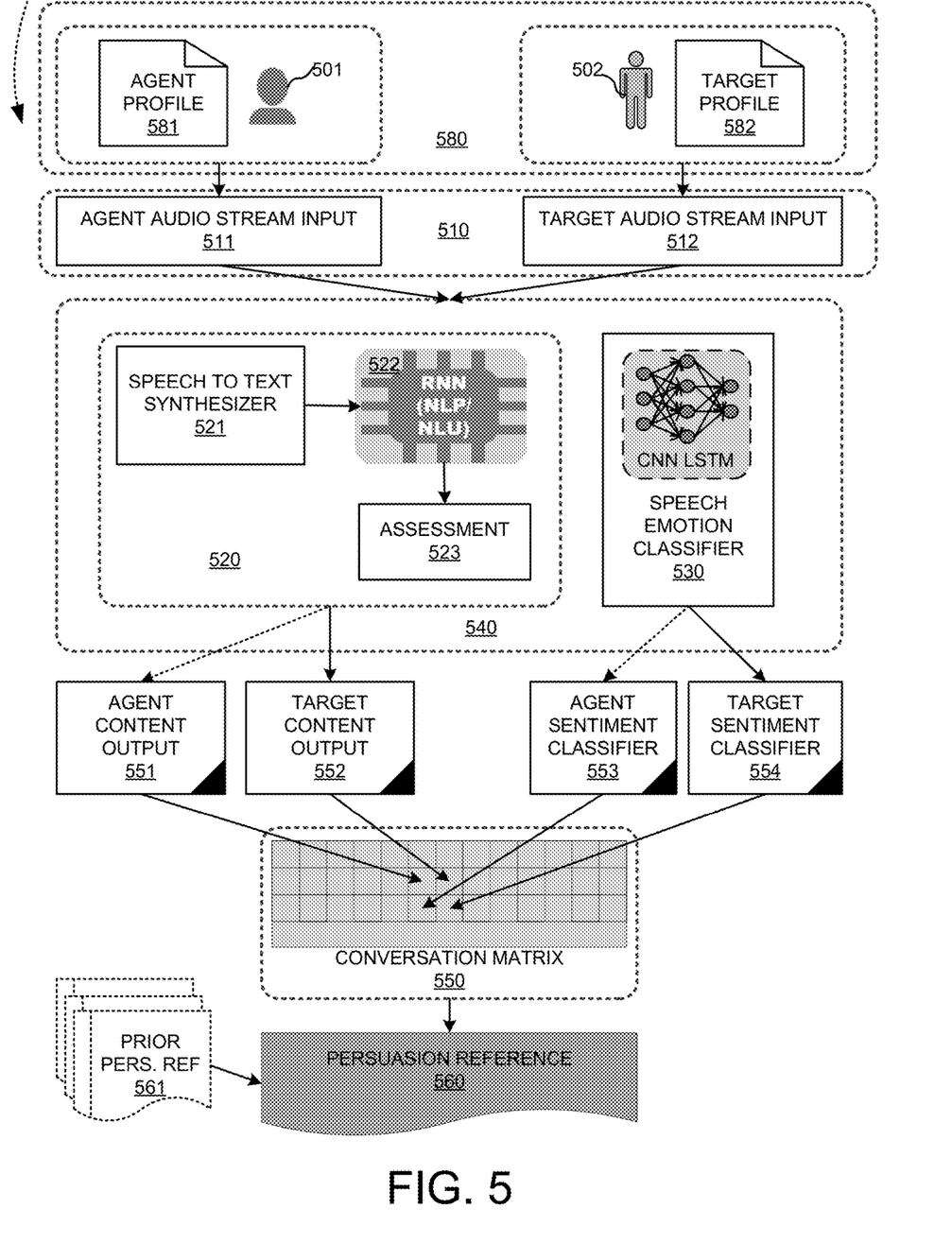
FIG. 5 illustrates an exemplary system diagram of an AI-based computer-aided persuasion system in accordance with embodiments of the current invention.

FIG. 5 illustrates an exemplary system diagram of an AI-based computer-aided persuasion system in accordance with embodiments of the current invention. An AI-based CAPS 500 includes an audio input module 510 that obtains a target audio stream from a target and an agent audio stream from an agent when the agent is engaging in a conversation with the target, wherein the conversation is a persuasion attempt for a first object, a content output module 520 that obtains an agent content output and a target content output by analyzing the agent audio stream and the target audio stream using a recurrent network (RNN) model, a speech classifier module 530 that obtains an agent sentiment classifier for the agent audio stream and a target sentiment classifier for the target audio stream, wherein each sentiment classifier is derived from an emotion classifier resulting from a convolutional neural network (CNN) model analysis of a corresponding audio stream, a conversation handling module 550 that updates a conversation matrix that contains prior and current audio stream analysis based on prior and current content outputs and sentiment classifiers for the agent and the target, and a persuasion reference module 560 that generates a persuasion reference based on the updated conversation matrix. In one embodiment, AI-based CAPS 500 further includes a profile module 580 that generates a target profile using DNN with the input of Big Data on target, wherein the target profile includes one or more objects, and wherein the agent is selected based on the generated profile and one or more selected objects.

Audio input module 510 obtains two audio streams, one from an agent 501 and one from a target 502. An agent audio stream input 511 captures the audio stream from agent 501 and passes it to a speech analyzer 540. A target the audio stream input 521 captures audio stream from target 502 and passes to speech analyzer 540. Speech analyzer 540 includes content output module 520 and speech classifier module 530.

In one novel aspect, CAPS 500 analyzes both the target audio stream and the agent audio stream. Content output module 520 performs an RNN-based automatic speech recognition (ASR) at step 521. An RNN (NLP/NLU) model 522 analyzes and classifies the text. At step 523, content output module 520 performs assessment based on the corresponding audio stream, such as the target audio stream and the agent audio stream. Content output module 520 generates an agent content output 551 and a target content output 552. Speech emotion classifier 530 also analyzes both the target audio stream and the target audio stream. Speech classifier 530 generates an agent sentiment classifier 553 and a target sentiment classifier 554 for corresponding audio streams. Speech analyzer 540 identifies several major discoveries in the attempt, namely, (1) new objects that, the target is interested in, (2) target/s emotion in general and specific to certain objects, and (3) emotion of the agent. Speech emotion analysis on target indicates the level of interest. New object content may be added on-the-fly based, on the interest level of the target. The speech emotion, analysis on target also offers guidance to help the agent in engaging the target. It the level of interest is low, the agent may drop the topic and move to another one. If the level of interest is neutral, the agent may try different strategies either to push it more aggressively or to push it gently, depending on the target's profile. This strategic guidance is also created dynamically and is accessible to the agent.

In one embodiment, the output of speech analyzer 540 is used to update the conversation matrix. The conversation matrix maintains the outputs of the history of the analyze results of the persuasion conversation. Conversation matrix 550 is used by the CAPS 500 to generate the persuasion reference 560. Persuasion reference 560 is updated dynamically based on the input and the analysis of the input from the target and the agent. In one embodiment, dynamic object content and guidance are streamed, to the agent's device during the attempt. Guidance can be implemented, in several manners. For example, scripts can be displayed on the UI of the agent's application, UI on the device can be color-coded, or emojis can be added to the UI. Furthermore, if physically possible, voice guidance through, the agent's earpieces can synchronize the dynamic object content in real time, similar to the audio augmented reality (AAR) technology. In another embodiment, persuasion reference 560 is generated further based on the one or more prior persuasion references 561, In one embodiment, CAPS 500 determines based on the audio stream input, the prior persuasion reference and/or persuasion guidance was not followed by the agent. CAPS 500 generates an updated persuasion reference for the agent based on the analysis of the prior persuasion reference and the input, from the agent, and/or the target. In another embodiment, the prior persuasion reference 561 is maintained as part of conversation matrix 560. In one embodiment, conversation matrix 560 includes timestamps for corresponding entries.

In one embodiment, CAPS 500 further includes a profile module 580 that generates and matches an agent profile 581 and a target profile 582. Profile module 580 uses Big Delta match persuader, the agent, with persuadee, the target, and persuasion topics, the object. The trinity match is further illustrated in the following paragraph.

Figure 6:
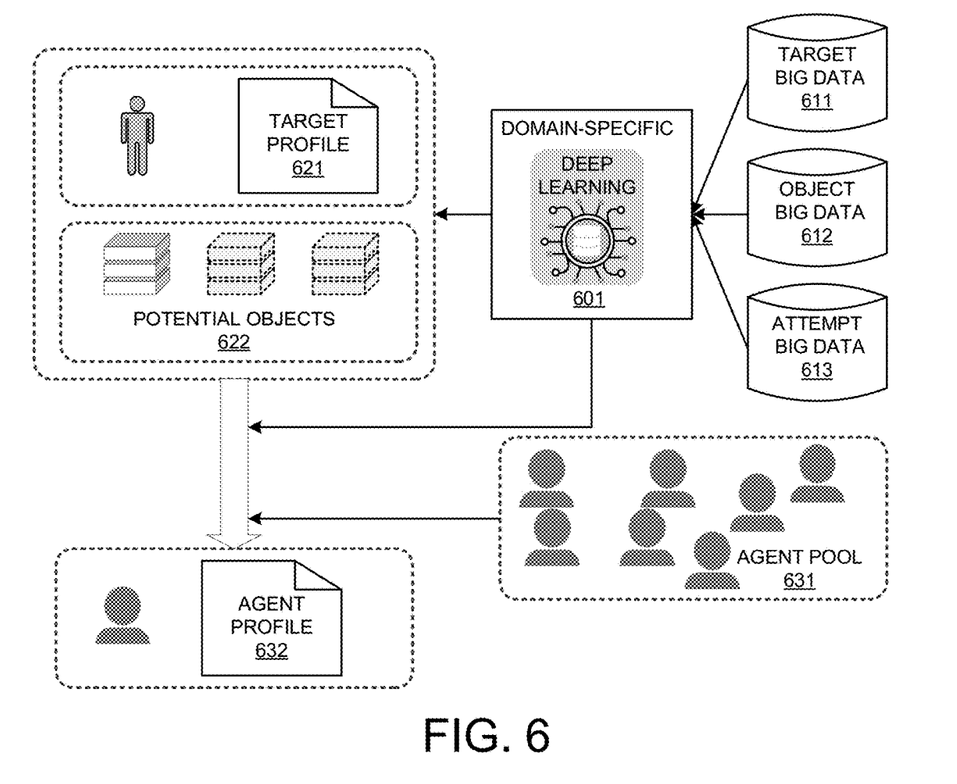
FIG. 6 illustrates an exemplary diagram performing an n-ary matching among at least the agent, the target, the object, and the attempt using the AI-based computer-aided persuasion system in accordance with embodiments of the current invention.

FIG. 6 illustrates an exemplary diagram performing an n-ary matching among at least the agent, the target, the object, and the attempt using the AI-based computer-aided persuasion system in accordance with embodiment of the current invention. The traditional persuasion system does not provide an effective way to have a n-ary matching for a persuasion process. The CAPS performs an n-ary matching by training and obtaining profiles of at least the target, the object, the agent, and the attempt. A domain-specific deep learning module 601 generates a target profile 621 based on a target Big Data 611. In one embodiment, based on object Big Data 612, domain-specific deep learning module 601 generates an associated potential object 622. One or more agents are selected from agent pool 631. Each selected agent has an agent profile that matches the target profile 621 and potential object 622. Since the target Big Data 611 and the object Big Data 612 are dynamically updated as more and more data becomes available, the n-ary matching among at least the target, the object, and the agent are more up-to-date and accurate. The persuasion process is more effective. In another embodiment, an attempt Big Data is used to generate a delivery modality/attempt reference (not shown). The delivery modality reference is used to select the agent more accurately. For example, based on the agent profile, the agent who is more proficient in one type of modality that is on the reference list associated with the target and/or the object is selected from a candidate agent pool.

Figure 7:
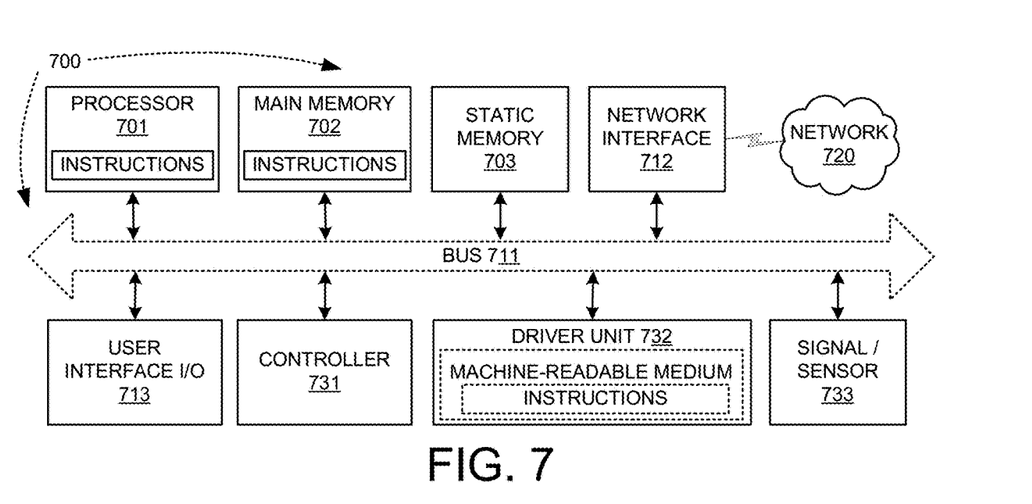
FIG. 7 illustrates an exemplary block diagram of a machine in the form of a computer system performing the AI-based computer-aided persuasion in accordance with embodiments of the current invention.

FIG. 7 illustrates an exemplary block diagram of a machine in the form of a computer system performing the AI-based computer-aided persuasion in accordance with embodiments of the current invention. In one embodiment, apparatus/device 700 has a set of instructions causing the device to perform any one or more methods for speech emotion recognition used for interview questions. In another embodiment, the device operates as a standalone device or may be connected through a network to other devices. Apparatus 700 in the form of computer system includes one or more processors 701, a main memory 702, a static memory unit 703, which communicates with other components through a bus 711. Network interface 712 connects apparatus 700 to network 720. Apparatus 700 further includes user interfaces and I/O component 713, controller 731, driver unit 732, and signal and/or sensor unit 733. Diver unit 732 includes a machine-readable medium on which stored one or more sets of instructions and data structures, such as software embodying or utilize by one or more methods for the speech emotion recognition function. The software may also reside entirely or partially within the main memory 702, the one or more processor 701 during execution. In one embodiment, the one or more processor 701 is configured to obtain a target audio stream from a target and an agent audio stream from an agent when the agent is engaging in a conversation with the target, wherein the conversation is a persuasion attempt for a first object; obtain an agent content output and a target content output by analyzing the agent audio stream and the target audio stream using a recurrent network (RNN) model; obtain an agent sentiment classifier for the agent audio stream and a target sentiment classifier for the target audio stream, wherein each sentiment classifier is derived from an emotion classifier resulting from a convolutional neural network (CNN LSTM) model analysis of a corresponding audio stream, update a conversation matrix that contains prior and current audio stream analysis based on prior and current content outputs and sentiment classifiers for the agent and the target; and generate a persuasion reference based on the updated conversation matrix. In one embodiment, software components running the one or more processors 701 run on different network-connected devices and communicate with each other via predefined network messages. In another embodiment, the functions can be implemented in software, firmware, hardware, or any combinations.

Figure 8:
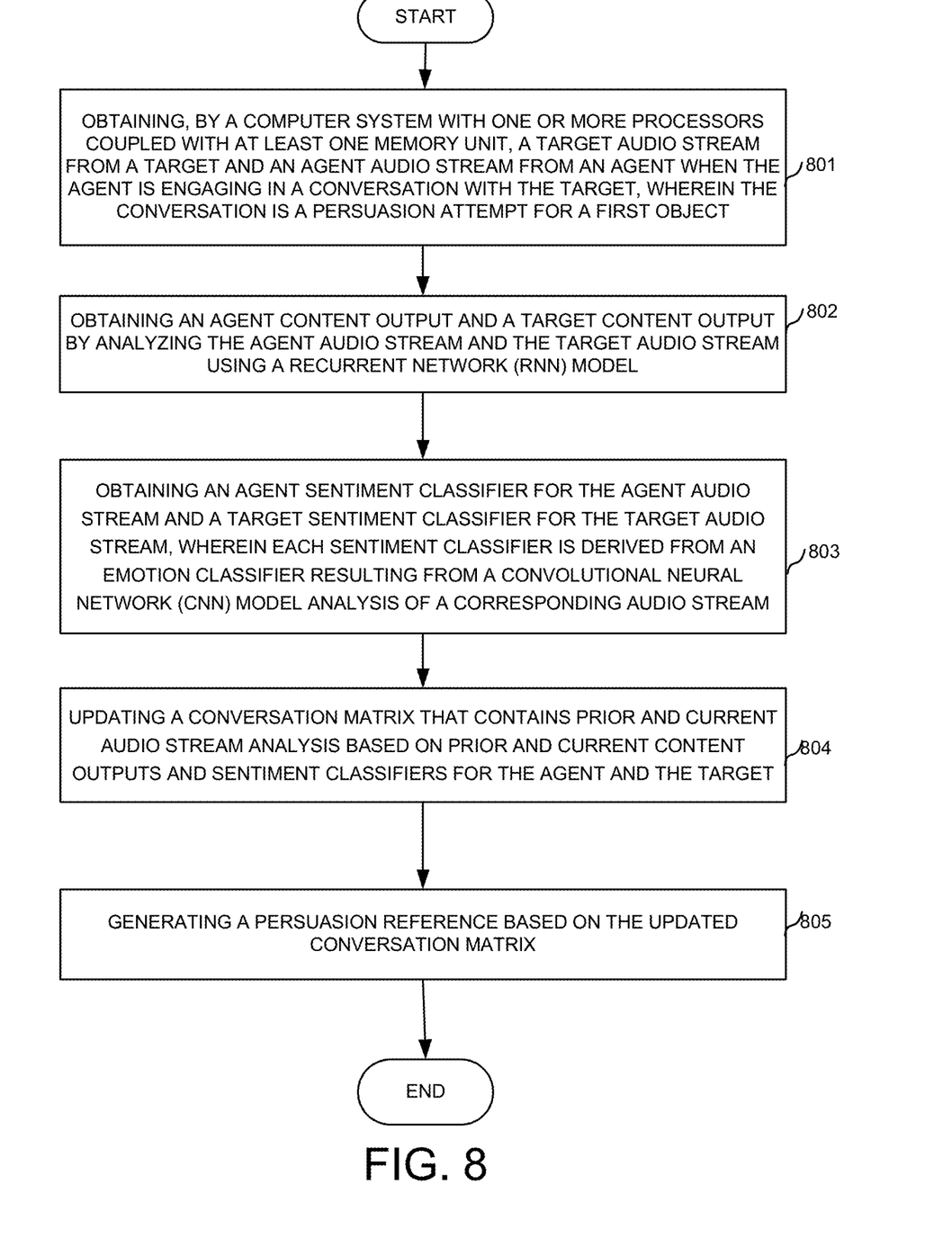
FIG. 8 illustrates an exemplary flow chart for the AI-based computer-aided persuasion system in accordance with embodiments of the current invention.

FIG. 8 illustrates an exemplary flow chart for the AI-based computer-aided persuasion system in accordance with embodiments of the current invention. At step 801, the CAPS obtains a target audio stream from a target and an agent audio stream from an agent when the agent is engaging in a conversation with the target, wherein the conversation is a persuasion attempt for a first object. At step 802, the CAPS obtains an agent content output and a target content output by analyzing the agent audio stream and the target audio stream using a recurrent network (RNN) model. At step 803, the CAPS obtains an agent sentiment classifier for the agent audio stream and a target sentiment classifier for the target audio stream, wherein each sentiment classifier is derived from an emotion classifier resulting from a convolutional neural network (CNN LSTM) model analysis of a corresponding audio stream. At step 804, the CAPS updates a conversation matrix that contains prior and current audio stream analysis based on prior and current content outputs and sentiment classifiers for the agent and the target. At step 805, the CAPS generates a persuasion reference based on the updated conversation matrix.

In one novel aspect, the prescriptive analytic system is provided to obtain the one or more off-topic (new topic) items based on the updated conversation matrix. The CAPS analyzes audio streams from both the agent and target to generate a persuasive reference. During the target-agent conversation, the target may go off-topic. The off-topic conversation provides additional information about the target and can be value information to develop prescriptive references.

If descriptive analytics tells you what has happened and predictive analytics tells you what could happen, then prescriptive analytics tells you what should be done. Ideally, prescriptive analytics (PA) is to maximize the optimal performance of a given system. More importantly, PA needs to provide reasons as basis for decision; users can understand the reasons of the prescription. In other words, PA becomes the rationality of decision making. There are basically two major approaches for PA, namely, data-driven and domain expert-driven. The data driven approach is similar to the predictive analysis that includes machine learning algorithms, statistical analysis, and probabilistic modeling but it offers one step further to include mathematical modeling, simulation and logic-based modeling. The major hurdle for data-driven in PA is the same culprit in predictive analytics, namely, it is difficult, if not impossible, to obtain a large set of meaningful prescriptive dataset to train the models. To compensate the lack of large dataset, simulation is used to create sufficient large random dataset for model training. Unfortunately, simulation of complex decision for insurance sales does not always work well. Furthermore, machine learning models and simulations are black boxes. They are not explainable. On the other hand, logic-based PA has many advantages; it does not need a large dataset (a large dataset is helpful, but it is not a prerequisite).

Figure 9:
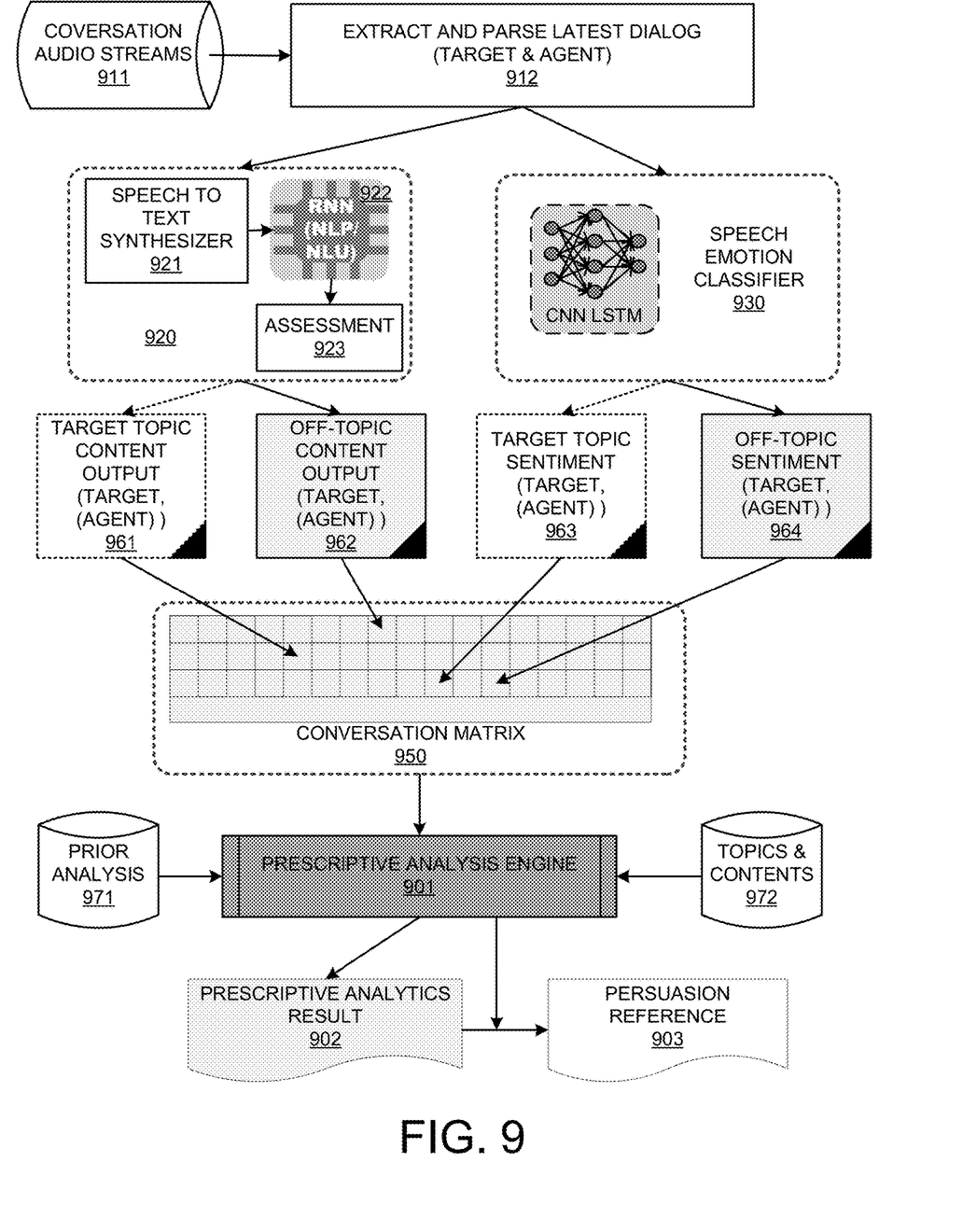
FIG. 9 illustrates exemplary diagrams for the top-level prescriptive analytics process in accordance with embodiments of the current invention.

FIG. 9 illustrates exemplary diagrams for the top-level prescriptive analytics process in accordance with embodiments of the current invention. A conversation audio stream process 911 obtains a target audio stream from a target when an agent is engaging in a conversation with the target on a target topic. In one embodiment, process 911 obtains an agent audio stream from the agent during the conversation of the target topic. A content output module 920 obtains a target content output by analyzing the target audio stream using a recurrent network (RNN) model. In one embodiment, module 920 further obtains an agent content output using the RNN model. A speech classifier module 930 obtains corresponding sentiment classifier for the audio stream. Each sentiment classifier is derived from an emotion classifier resulting from a convolutional neural network (CNN LSTM) model analysis of a corresponding audio stream. A conversation handling module 950 that updates a conversation matrix that updates a conversation matrix that contains prior and current target audio stream analysis based on prior and current target content output and sentiment classifiers for the target content output. A prescriptive analytic module 901 generates prescriptive analytics result 902 for the one or more off-topic items based on the updated conversation matrix.

In one novel aspect, one or more off-topic items are detected in the target content output. The off-topic items include contents that are not part of the on-topic contents of the original conversation/dialog. The off-topic items are detected/identified using the RNN model. In one embodiment, the prescriptive analytics engine 901 correlates the identified off-topic items with perspective objects that the customer/target might be interested. In one embodiment, the prescriptive analytics engine 901 generates persuasive references for these identified off-items based on topic and contents 972. In one embodiment, the prescriptive analytics result includes the one or more off-topic items with corresponding likelihood of success. Each likelihood of success of corresponding off-topic item generated from the conversation matrix using the RNN model. Persuasion reference 902 includes an exploitation guidance focused on the target topic and an exploration guidance on the one or more off-topic items. In a persuasion process there are two major methods, namely, exploitation and exploration. Exploitation is to focus working on current topics, i.e., on-topic, without wandering around. Exploration is to try out new topics, i.e., off-topic, where we explore new direction that might lead us to better position. In one embodiment, different strategies are generated based on the prescriptive analytics result, such as a greedy strategy and a proliferative strategy. A greedy strategy focuses on maximizing the reward or success in the short term. For example, if the target shows extremely positive emotion of a topic, the strategy will prioritize and allocate resources to support the topic, regardless of on-topic or off-topic. A proliferative strategy, on the other hand, considers the total reward or success for the long term. The objectives are to sow the seeds and rapidly grow the potential topics. When the agent starts conversation with the target, the initial topic might simply be for ice breaking. The agent might move fast from a topic to another topic so that he can explore and identify topics that attract the target. It builds a pipeline of topics and progresses forward dynamically. Table-1 illustrates an exemplary conversation matrix with on- and off-topic entries.

TABLE 1

| | | | | | | | | |
|---|---|---|---|---|---|---|---|---|
| | | | conversation matrix with off-topic entries | | | | | |
| D | SEQ ID | AGENT TIME STAMP | TOPIC | EMOTION | TARGET TIME STAMP | TOPIC | EMOTION | ON/OFF TOPIC |
| #1 | 11010234 | 2021-01-19 03:14:07 | A | EXCITED | 2021-01-19 03:14:15 | A | NEUTRAL | ON-TOPIC |
| | | | | | 2021-01-19 03:14:15 | B | EXCITED | OFF-TOPIC |
| | | | | | 2021-01-19 03:14:30 | C | HAPPY | OFF-TOPIC |
| #2 | ...˙ | ...˙ | ...˙ | ...˙ | ...˙ | ...˙ | ...˙ | ...˙ |

Table-1 shows an exemplary conversation/dialog #1 between the target and the agent on a target topic. The annotated dialog shows Topic-A is the conversation topic initiated by the agent, hence it is called on-topic or the target topic. Target's responses to the conversation topic can have many variations. For instance, in this example, target is neutral to Topic-A. However, the target brought up Topic-B and Topic-C with different emotions. Topics B and C are called off-topics since they are not the subject of the current target topic initiated by agent. There are situations that target may have different reactions to a topic in the same dialog. In this case, the annotated dialog will use the most recent responses. The Prescriptive Analytics Engine 901 will take this annotated dialog, prior outputs 971, including prior prescriptive analytics result, and the topics and contents 972 as inputs to prescribe the next prescriptive analytics result 902. In one embodiment, the conversation matrix further contains prior and current agent audio stream analysis based on prior and current agent content output generated using the RNN model and sentiment classifiers for the agent content output. Prescriptive Analytics Engine 901 generates a persuasive reference 902 based on the prescriptive analytics result 902 and outputs for the agent.

In one embodiment, the Prescriptive Analytics Engine is model as a finite state machine (FSM) with the emotion as state and the persuasion strategy as action plan to transit in the FSM.

Figure 10:
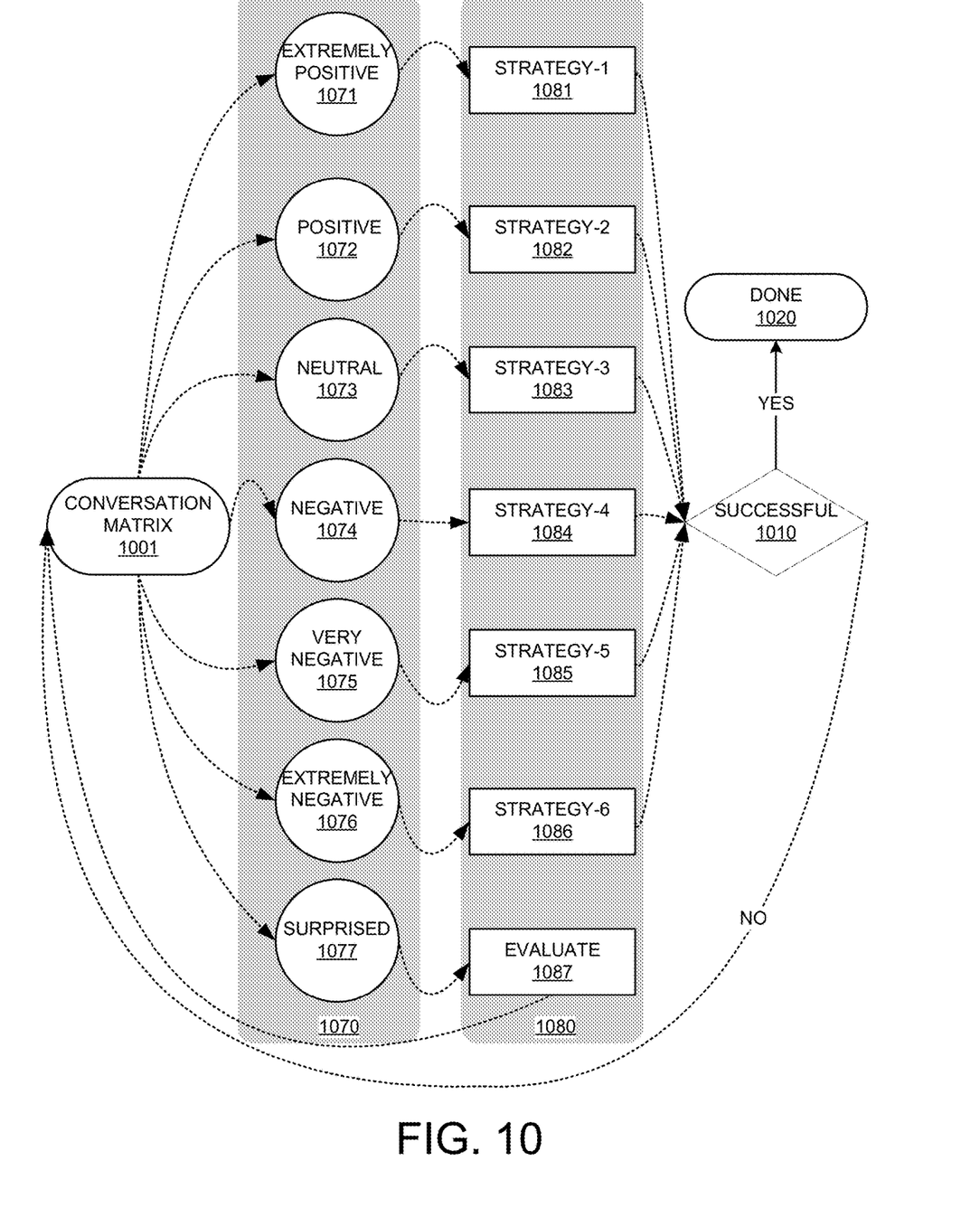
FIG. 10 illustrates exemplary diagrams of the finite state machine (FSM) for the prescriptive analytics engine in accordance with embodiments of the current invention.

FIG. 10 illustrates exemplary diagrams of the finite state machine (FSM) for the prescriptive analytics engine in accordance with embodiments of the current invention. Conversation matrix 1001 is identified as one of the state 1070 in the FSM, including extremely positive 1071, positive 1072, neutral 1073, negative 1074, very negative 1075, extremely negative 1076, and surprised 1077. They are essentially emotions identified by the speech emotion classifier on the dialog between the agent and the target. Surprised 1077 can be either positive or negative. Therefore, process Evaluate (1087) is needed to ascertain its nature, for example, with a simple follow-up question. The FSM states corresponds to sentiment classifiers which are derived from corresponding emotion classifier resulting from a convolutional neural network (CNN LSTM) model analysis of a corresponding audio stream. The emotion classifier is one selecting from an emotion group comprising angry emotion, excited emotion, frustrated emotion, happy emotion, neutral emotion, sad emotion, and surprised emotion. For each state, a strategy 1080, including strategy-1 1081, strategy-2 1082, strategy-23 1083, strategy-4 1084, strategy-5 1085, strategy-6 1086, and Evaluate 1087, is prescribed to the agent. When the agent carries out the strategy, the dialog is captured, analyzed, and appended to the Conversation Matrix. The strategy is implemented and checked, at step 1010, to determine if the strategy is successful. The state transition is finished when the persuasion succeeds. If step 1010 determines yes, the FSM enters 1020 "done." If step 1010 determines no, the FSM goes back to 1001 for a new iteration.

The prescriptive engine is to implement this state diagram. The prescriptive engine can be implemented by circuits, software, firmware, or a combination of them. In other embodiments, the prescriptive engine can be implemented on one processor or multiple processors or multiple devices communicating through signal message or internet communication. The FSM diagram of the prescriptive engine is represented in the following decision table, Table-2, for example in an iterative loop of IF-Then-ELSE statements.

time on exploitation and 2% time on exploration. That is to say, if the session runs for thirty minutes, the agent should spend twenty-nine minutes on exploiting the current topic, hopefully succeeds in so doing, and spend one minute in exploration by introducing off-topic items based on the association, market basket or other data mining recommendations. The Prescriptive Engine will interface with the Contents and Topics dataset to dynamically generate the persuasion contents of the on-topic or potential off-topics. As for the tone of voice, there is a general core tone of voice that all agents abide to; they are, namely, patient, respectful and caring. Other tones of voice are enthusiastic and empathetic. In addition, in persuading the target, the agent's attitude matters. There are three general attitudes being used in the recommendations. Assertive attitude refers to "formal, informative, trustworthy, serious and professional" attitude. Rapport building refers to agent's attitude to establish an emotional connection to the target by sharing experience or views, by finding things in commons, by sharing personal experiences be it happy or sad. Rapport building is to develop the bonding between agent and target. Compassion is to "suffer together". "Compassionate" is for the agent the share the pain, sadness, and frustration of the target and to find solution to overcome it. For example, consider Strategy-4 when the target shows sadness regarding the current topic. The game plan for greedy approach will focus 80% on exploration and 20% on exploitation. The tone of voice adopts the core tone of voice with empathetic. The execution plan is to be compassionate and rapport building. The actions are to build trust and rapport. Action plans in Table-2 are results of an empirical study and it is not a general and definitive scheme for other persuasion projects. In other

TABLE 2

Decision Table for Prescriptive Analytics

| | | Strategic Plan | | | | | | | | | | | |
|---|---|---|---|---|---|---|---|---|---|---|---|---|---|
| | | 1 | | 2 | | 3 | | 4 | | 5 | | 6 | |
| Condition | Agent Goal | G | P | G | P | G | P | G | P | G | P | G | P |
| | Target Emotion | E | E | H | H | N | N | S | S | F | F | A | A |
| Action | Exploit | 98% | 98% | 98% | 98% | 80% | 50% | 20% | 10% | 30% | 10% | 10% | 10% |
| | Exploration | 2% | 2% | 2% | 2% | 20% | 50% | 80% | 90% | 70% | 90% | 90% | 90% |
| | Agent Tone | C + E | C + E | C + E | C + E | C | C | C + Em | C + Em | C + Em | C + Em | C + Em | C + Em |
| | Agent Attitude | A | A | A | A | A + RB | Cm + RB | Cm + RB | Cm + RB | Cm + RB | Cm + RB | Cm + RB | Cm + RB |

Agent Goal: G—Greedy; P—Proliferative
Target Emotion: E—Excited; H—Happy; N—Neutral; S—Sad; F—Frustrated; A—Angry.
Agent Tone: C + E—Core + Enthusiastic; C—Core; C + Em—Core + Empathetic.
Agent Attitude: A—Assertive; A + BR—Assertive + Rapport Building; Cm + RM—Compassionate + Rapport Building The decision table has two portions. The top "condition" portion describes the conditions that include the strategic plan in consideration, the agent's goal and the current target's emotion. The lower "action" portion indicates the recommended actions. The strategies are designed for each of the state based on the target's emotion from the conversation. Agent's goal is the objective whether the agent wants to have fast short-term reward, i.e., greedy, or, if the agent is working to maximize his long-term reward, i.e., proliferative approach.

The actions include two major recommendation components: the game plan and the execution plan. The game plan is essentially the balance of efforts and resources allocation between exploitation and exploration. The execution plan suggests how the agent should communicate to the target. For instance, consider Strategy 1 when the target is excited about the current topic. The game plan is to allocate 98% embodiments, the prescriptive analytics engine obtains large dataset and uses machine learning to generate the action plan. In another embodiment, domain expert system is used to define rules to generate the action plans.

Figure 11:
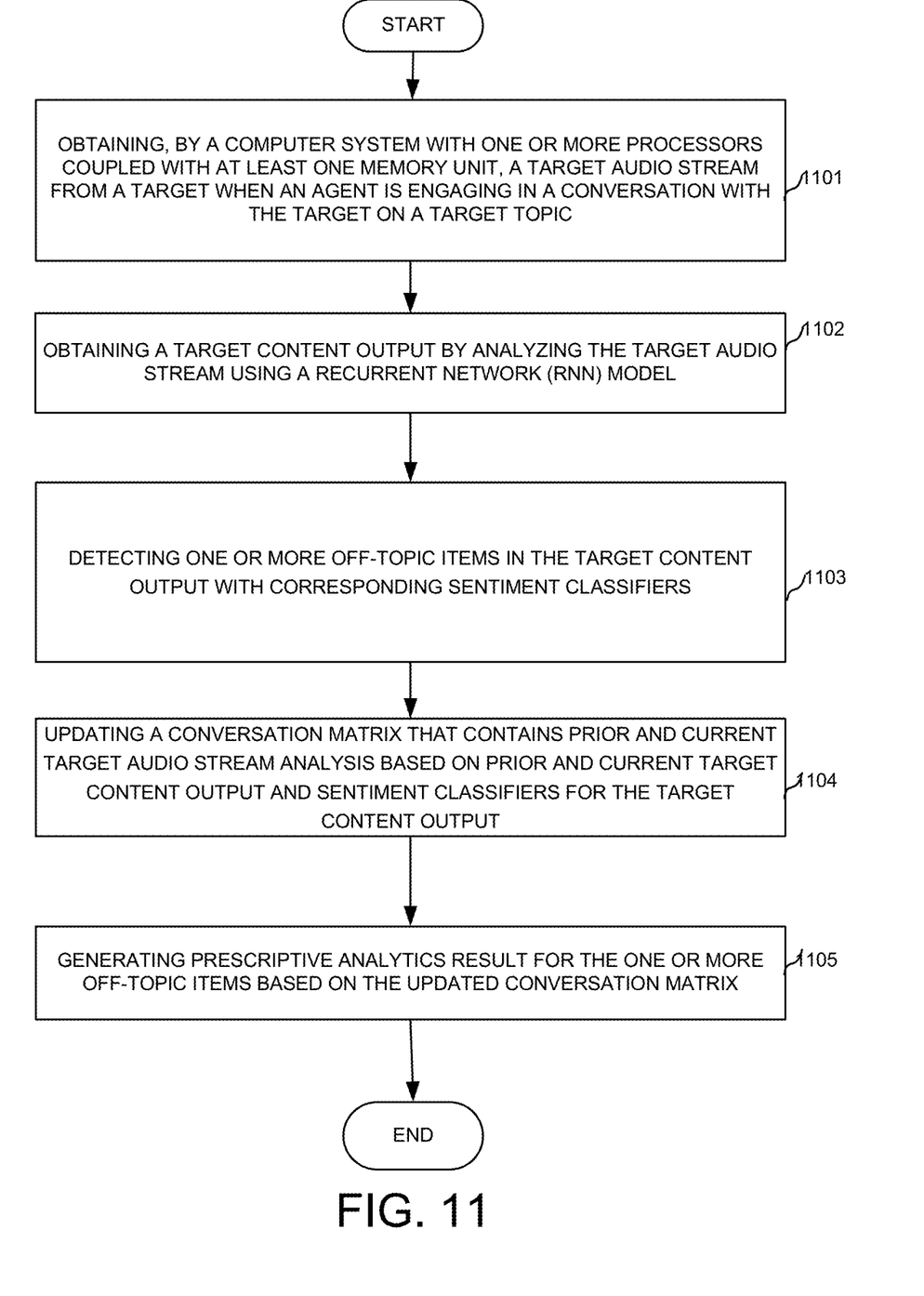
FIG. 11 illustrates an exemplary flow chart of the prescriptive analytics process in accordance with embodiments of the current invention.

FIG. 11 illustrates an exemplary flow chart of the prescriptive analytics process in accordance with embodiments of the current invention. At step 1101, the system obtains a target audio stream from a target when an agent is engaging in a conversation with the target on a target topic. At step 1102, the system obtains a target content output by analyzing the target audio stream using a recurrent network (RNN) model. At step 1103, the system updates a conversation matrix that contains prior and current target audio stream analysis based on prior and current target content output and sentiment classifiers for the target content output. At step 1104, the system updates a conversation matrix that contains prior and current target audio stream analysis based on prior and current target content output and sentiment classifiers for the target content output. At step 1105, the system generates prescriptive analytics result for the one or more off-topic items based on the updated conversation matrix.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed:

1. A method, comprising:
    obtaining, by a computer system with one or more processors coupled with at least one memory unit, a target audio stream from a target when an agent is engaging in a conversation with the target on a target topic;
    obtaining a target content output by analyzing the target audio stream using a recurrent network (RNN) model;
    detecting one or more off-topic items in the target content output with corresponding sentiment classifiers;
    updating a conversation matrix that contains prior and current target audio stream analysis based on prior and current target content output and sentiment classifiers for the target content output;
    generating prescriptive analytics result for the one or more off-topic items based on the updated conversation matrix.

2. The method of claim 1, wherein the prescriptive analytics result includes the one or more off-topic items with corresponding likelihood of success.

3. The method of claim 2, wherein each likelihood of success of corresponding off-topic item generated from the conversation matrix using the RNN model.

4. The method of claim 3, further comprising: generating a persuasion reference based on the prescriptive analytics result.

5. The method of claim 4, wherein the persuasion reference includes an exploitation guidance focused on the target topic and an exploration guidance on the one or more off-topic items.

6. The method of claim 5, wherein the exploration guidance is allocated a percentage of time based on the prescriptive analytics result.

7. The method of claim 1, wherein the conversation matrix further contains prior and current agent audio stream analysis based on prior and current agent content output generated using the RNN model and sentiment classifiers for the agent content output.

8. The method of claim 1, wherein each sentiment classifier is derived from an emotion classifier resulting from a convolutional neural network (CNN LSTM) model analysis of a corresponding audio stream.

9. The method of claim 8, wherein the emotion classifier is one selecting from an emotion group comprising angry emotion, excited emotion, frustrated emotion, happy emotion, neutral emotion, sad emotion, and surprised emotion, and the sentiment classifier is one selecting from a sentiment group comprising extremely positive, positive, neutral, negative, extremely negative, and surprised.

10. The method of claim 9, wherein each sentiment classifier prescribes a corresponding strategy delivered by the agent through follow up conversations that updates the conversation matrix with new audio streams from the follow up conversations.

11. A system comprising:
    an audio input module that obtains a target audio stream from a target when an agent is engaging in a conversation with the target on a target topic;
    a content output module that an agent and target content output by analyzing the audio stream using a speech to text module and then a recurrent network (RNN) model to learn the textual content;
    an off-topic module that detects one or more off-topic items in the target content output with corresponding sentiment classifiers;
    a conversation handling module that updates a conversation matrix that contains prior and current target audio stream analysis based on prior and current target content output and sentiment classifiers for the target content output;
    a prescriptive analytic module that generates prescriptive analytics result for the one or more off-topic items based on the updated conversation matrix.

12. The system of claim 11, wherein the prescriptive analytics result includes the one or more off-topic items with corresponding likelihood of success.

13. The system of claim 12, wherein each likelihood of success of corresponding off-topic item generated from the conversation matrix using the RNN model.

14. The system of claim 13, further comprising: generating a persuasion reference based on the prescriptive analytics result.

15. The system of claim 14, wherein the persuasion reference includes an exploitation guidance focused on the target topic and an exploration guidance on the one or more off-topic items.

16. The system of claim 15, wherein the exploration guidance is allocated a percentage of time based on the prescriptive analytics result.

17. The system of claim 11, wherein the conversation matrix further contains prior and current agent audio stream analysis based on prior and current agent content output generated using the RNN model and sentiment classifiers for the agent content output.

18. The system of claim 11, wherein each sentiment classifier is derived from an emotion classifier resulting from a convolutional neural network (CNN LSTM) model analysis of a corresponding audio stream.

19. The system of claim 18, wherein the emotion classifier is one selecting from an emotion group comprising angry emotion, excited emotion, frustrated emotion, happy emotion, neutral emotion, sad emotion, and surprised emotion, and the sentiment classifier is one selecting from a sentiment group comprising extremely positive, positive, neutral, negative, extremely negative, and surprised.

20. The system of claim 19, wherein each sentiment classifier prescribes a corresponding strategy delivered by the agent through follow up conversations that updates the conversation matrix with new audio streams from the follow up conversations.

* * * * *